United States Patent
Kou

(10) Patent No.: US 7,083,172 B2
(45) Date of Patent: Aug. 1, 2006

(54) METHOD FOR CONTROLLING ANTI-ROLL/ANTI-YAW OF VEHICLES

(75) Inventor: Youseok Kou, Kyonggi-do (KR)

(73) Assignee: Mando Corporation, Kyonggi-do (KR)

( * ) Notice: Subject to any disclaimer, the term of this patent is extended or adjusted under 35 U.S.C. 154(b) by 337 days.

(21) Appl. No.: 10/642,294

(22) Filed: Aug. 18, 2003

(65) Prior Publication Data

US 2004/0038599 A1 Feb. 26, 2004

(30) Foreign Application Priority Data

Aug. 20, 2002 (KR) ...................... 10-2002-0049218

(51) Int. Cl.
*B60G 17/00* (2006.01)
*B60G 17/016* (2006.01)

(52) U.S. Cl. ................ 280/5.507; 280/5.503; 280/5.508; 280/5.519; 701/38

(58) Field of Classification Search ............ 280/5.507, 280/5.503, 5.508, 5.51, 5.512, 5.515, 5.519; 701/37, 38
See application file for complete search history.

(56) References Cited

U.S. PATENT DOCUMENTS

| | | | | |
|---|---|---|---|---|
| 4,624,476 A | * | 11/1986 | Tanaka et al. ............. | 280/5.51 |
| 5,046,008 A | * | 9/1991 | Dieter ........................ | 701/38 |
| 5,066,041 A | * | 11/1991 | Kindermann et al. ..... | 280/5.506 |
| 5,390,121 A | * | 2/1995 | Wolfe .......................... | 701/37 |
| 5,513,108 A | * | 4/1996 | Kishimoto et al. ........... | 701/38 |
| 5,576,959 A | * | 11/1996 | Hrovat et al. .................. | 701/70 |
| 5,638,275 A | * | 6/1997 | Sasaki et al. .................. | 701/38 |
| 5,732,371 A | * | 3/1998 | Fujita ........................... | 701/38 |
| 5,822,709 A | * | 10/1998 | Fujita ........................... | 701/70 |
| 6,053,583 A | * | 4/2000 | Izumi et al. ................ | 303/150 |
| 6,181,997 B1 | * | 1/2001 | Badenoch et al. ............ | 701/37 |
| 6,285,935 B1 | * | 9/2001 | Murata ........................ | 701/37 |
| 6,505,108 B1 | * | 1/2003 | Bodie et al. .................. | 701/41 |
| 6,519,517 B1 | * | 2/2003 | Heyring et al. ............... | 701/37 |
| 6,556,908 B1 | * | 4/2003 | Lu et al. ....................... | 701/38 |
| 6,631,317 B1 | * | 10/2003 | Lu et al. ....................... | 701/45 |
| 6,654,674 B1 | * | 11/2003 | Lu et al. ....................... | 701/36 |
| 6,684,140 B1 | * | 1/2004 | Lu ............................... | 701/37 |
| 6,711,482 B1 | * | 3/2004 | Shiino et al. ................. | 701/37 |
| 6,751,537 B1 | * | 6/2004 | Koh ............................ | 701/37 |

FOREIGN PATENT DOCUMENTS

| | | | |
|---|---|---|---|
| JP | 08-183318 | * | 7/1996 |
| JP | 09-109641 | * | 4/1997 |
| JP | 11-115440 | * | 4/1999 |

* cited by examiner

*Primary Examiner*—Paul N. Dickson
*Assistant Examiner*—George D. Spisich
(74) *Attorney, Agent, or Firm*—Bacon & Thomas, PLLC

(57) ABSTRACT

A method for controlling roll/yaw motions of a vehicle includes the steps of deciding whether an anti-roll control is required or not by comparing a roll rate of the vehicle with a predetermined threshold roll rate, executing the anti-roll control if the roll rate is larger than the predetermined threshold roll rate, deciding whether an anti-yaw control is required or not by comparing a difference between an actual yaw rate of a vehicle and a desired yaw rate with a predetermined threshold yaw rate and executing the anti-yaw control if the difference between the actual yaw rate and the desired yaw rate is larger than the predetermined threshold yaw rate. During the anti-roll control, both right and left front wheel dampers and both right and left rear wheel dampers are hard-controlled at the same time. Further, during the anti-yaw control, both right and left front wheel dampers are hard-controlled and both right and left rear wheel dampers are soft-controlled.

3 Claims, 2 Drawing Sheets

METHOD FOR CONTROLLING ANTI-ROLL/ANTI-YAW OF VEHICLES

FIELD OF THE INVENTION

The present invention relates to a method for controlling roll/yaw motions of a vehicle; and, more particularly, to a method for optimizing anti-roll/anti-yaw control of a vehicle by adjusting damping forces of front and rear dampers installed in the vehicle.

BACKGROUND OF THE INVENTION

In general, a vehicle is equipped with a suspension system to improve its ride comfort and road-holding efficiency. The suspension system includes a spring and a shock absorber, i.e., a damper.

Conventionally, the damper is installed in parallel to a spring positioned between a body and a wheel of the vehicle. The damper absorbs vibrations of the vehicle that are caused by an impact on the spring when the vehicle travels. In other words, the damper reduces vertical kinetic energy of the spring so as to improve the ride comfort.

Recently, an increasing number of vehicles use a variable damper capable of controlling the damping force to further improve the ride comfort. In this case, the damping force is controlled by employing a control logic.

A conventional ECS (electronics controlled suspension) system employing such a control logic utilizes a steering angle sensor, a yaw rate sensor, a lateral G sensor, a vehicle speed sensor, a wheel speed sensor, in order to attain an anti-roll control thereby providing steering stability of a vehicle.

However, even though a vehicle uses the ECS system, a driver of the vehicle may experience an under- or over-steering phenomenon in an environment where the road surface is slippery or urgent steering is required. In such a situation, the vehicle may not be steered as the driver desires. Accordingly, in order to prevent such phenomena, an anti-yaw control is required in addition to the anti-roll control.

SUMMARY OF THE INVENTION

It is, therefore, a primary object of the present invention to provide a method for controlling roll and yaw motions of a vehicle, thereby providing a stable steering of a vehicle even in an under- or over-steering situation.

In accordance with the present invention, there is provided a method for providing an anti-roll and an anti-yaw control, including the steps of: deciding whether an anti-roll control is required or not by comparing a roll rate of the vehicle with a predetermined threshold roll rate; executing the anti-roll control if the roll rate is larger than the predetermined threshold roll rate; deciding whether an anti-yaw control is required or not by comparing a difference between an actual yaw rate of the vehicle and a desired yaw rate with a predetermined threshold yaw rate; and executing the anti-yaw control if the difference between the actual yaw rate and the desired yaw rate is larger than the predetermined threshold yaw rate.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
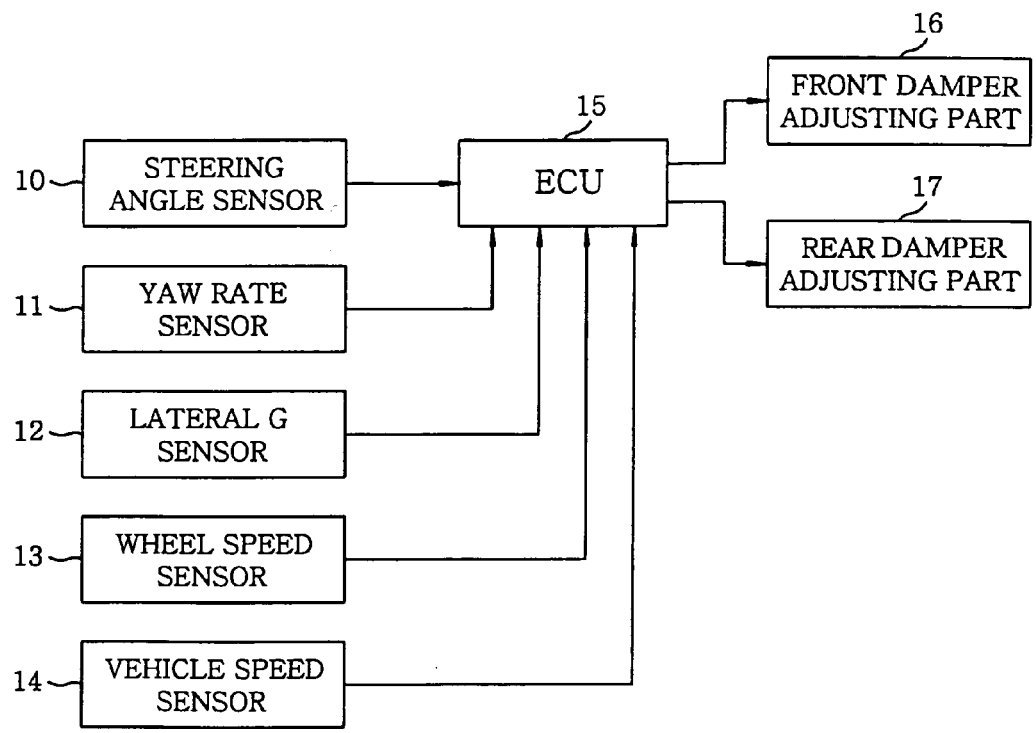
FIG. 1 presents a block diagram showing an apparatus employing a method for providing an anti-roll/anti-yaw control of a vehicle in accordance with the present invention.

FIG. 1 charts a block diagram showing an apparatus employing a method for controlling roll/yaw motions of a vehicle in accordance with the present invention.

The apparatus of the present invention includes a steering angle sensor 10, a yaw rate sensor 11, a lateral G sensor 12, a wheel speed sensor 13, a vehicle speed sensor 14, an ECU (electronic control unit) 15, a front damper adjusting part 16 and a rear damper adjusting part 17.

The steering angle sensor 10 detects a steering angle of a vehicle and then provides the detected steering angle data to the ECU 15. Further, the yaw rate sensor 11 measures a yaw rate of the vehicle and then transfers the measured yaw rate data to the ECU 15.

Meanwhile, the lateral G sensor 12 detects a lateral G of the vehicle and then provides the detected lateral G data to the ECU 15.

The wheel speed sensor 13 includes four wheel speed sensors provided at front and rear wheels of the vehicle to detect a speed of each of the wheels, which is provided to the ECU 15. Further, the vehicle speed sensor 14 estimates a speed of the vehicle and then provides the estimated speed data to the ECU 15.

The ECU 15 controls the front damper adjusting part 16 and the rear damper adjusting part 17 based on the data provided from the steering angle sensor 10, the yaw rate sensor 11, the lateral G sensor 12, the wheel speed sensor 13 and the vehicle speed sensor 14.

In the ensuing discussion, the basic concept of the novel method for controlling roll/yaw motions of a vehicle in accordance with the present invention will be described.

As mentioned above, in an environment where the road surface is slippery or an urgent steering is required, the driver of a vehicle may experience an under- or over-steering phenomenon.

Such unstable driving conditions may depend on the type of the vehicle, road surface conditions and the capacity of dampers, etc. On a normal road surface, for example, a vehicle traveling over 80 kph may become unstable in case that the steering handle is rotated by more than 80 degrees per second. However, on a snowy or rainy road, the unstable conditions may occur more readily.

Main factors of the unstable conditions are road surface conditions and the degree of steering. In the present invention, the ECU 15 detects the road surface conditions by using the lateral G data as well as the wheel speed data and the characteristics of a vehicle such as a tread thereof. For instance, if the difference between lateral G measured in the lateral G sensor 12 and lateral G determined by using the wheel speed sensor data and the characteristics of a vehicle is larger than a predetermined level, the road surface is determined to be in a slippery condition. On the other hand, the ECU 15 decides the degree of steering by using the steering angle data provided from the steering angle sensor 10.

In such unstable conditions, yawing as well as rolling of a vehicle may take place. Therefore, the anti-yaw control as well as the anti-roll control is required.

For the purpose of realizing the optimization of the anti-roll and anti-yaw controls, a priority order thereof may need be determined. Between the anti-roll and anti-yaw controls, the anti-roll control plays a main role for an initial motion of a vehicle. However, if the anti-roll control has a priority over the anti-yaw control throughout the whole movement of the vehicle, there may be a problem that the anti-yaw control is totally disturbed. On the other hand, if the anti-yaw control has a priority over the anti-roll control throughout the entire vehicle movement, the anti-roll control may be not performed during the initial motion. Therefore, the priority order and output patterns of the anti-roll and anti-yaw controls need be properly adjusted.

Figure 2:
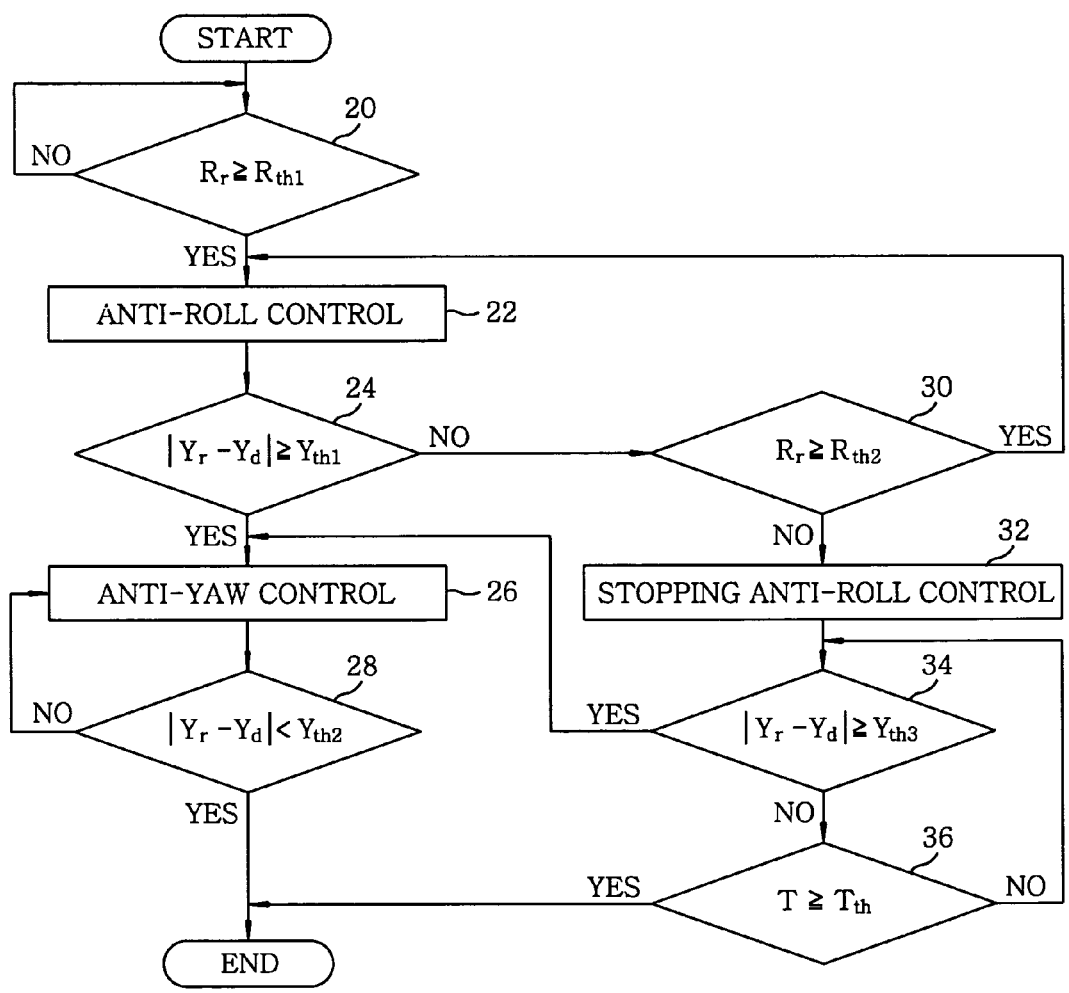
FIG. 2 describes a flowchart illustrating the inventive method for providing an anti-roll/anti-yaw control of a vehicle in accordance with a preferred embodiment of the present invention.

FIG. 2 describes a flowchart showing the inventive method for providing anti-roll/anti-yaw controls of a vehicle in accordance with a preferred embodiment of the present invention.

First, the ECU 15 decides whether the anti-roll control is required or not by comparing a roll rate $R_r$ with a predetermined threshold roll rate $R_{th1}$ (step 20). Herein, the ECU 15 calculates the roll rate $R_r$ by using the data provided from the steering angle sensor 10 and the vehicle speed sensor 14. The predetermined threshold roll rate $R_{th1}$ may vary depending on the characteristics of a vehicle. Generally, if a vehicle traveling at a middle or high speed turns abruptly, the anti-roll control is required.

If the roll rate $R_r$ is larger than the predetermined threshold roll rate $R_{th1}$, the ECU 15 executes the anti-roll control but not the anti-yaw control during an initial motion by controlling the respective dampers mounted in the vehicle through the front wheel dampers adjusting part 16 and the rear wheel dampers adjusting part 17 (step 22).

Results of testing and analyzing the characteristics of a vehicle during the unstable conditions show that the anti-yaw control is not required because the over- and under-steering phenomena of the vehicle are not serious during the initial motion. In other words, an initial stability of the vehicle can be secured though the anti-roll control has priority over the anti-yaw control for the initial motion. The anti-roll control of the present invention may be implemented by hard-controlling simultaneously both the right and left front wheel dampers and both the right and left rear wheel dampers. Here, "hard-controlling" means that the dampers generate a maximum damping force.

Thereafter, the ECU 15 decides whether the anti-yaw control is required or not by comparing a difference between an actual yaw rate $Y_r$ and a desired yaw rate $Y_d$ with a predetermined threshold yaw rate $Y_{th1}$ (step 24). The actual yaw rate $Y_r$ is measured by the yaw rate senor 11, and the desired yaw rate $Y_d$ is calculated by using characteristics of the vehicle such as its wheelbase as well as the data provided from the steering angle sensor 10, the lateral G sensor 12, the wheel speed sensor 13 and the vehicle speed sensor 14. The predetermined threshold yaw rate $Y_{th1}$ may be changed depending on the characteristics of the vehicle.

If the difference between the actual yaw rate $Y_r$ and the desired yaw rate $Y_d$ is larger than the predetermined threshold roll rate $Y_{th1}$, the ECU 15 executes the anti-yaw control by controlling the dampers mounted in the vehicle through respectively the front wheel dampers adjusting part 16 and the rear wheel dampers adjusting part 17 (step 26).

Results of testing and analyzing the characteristics of a vehicle during the unstable conditions show that the anti-yaw control is required because the yawing of the vehicle increases excessively during a latter motion. The anti-yaw control of the present invention is not performed by adjusting an output pattern of the anti-yaw control in proportion to an amount of yawing. Instead, both the right and left front wheel dampers are hard-controlled and both the right and left rear wheel dampers are soft-controlled. Here, "soft-controlling" represents that the dampers generate a minimum damping force. Whether the dampers are hard-controlled or soft-controlled is determined depending on magnitude of current flowing through the dampers.

While executing the anti-yaw control, the ECU 15 compares the difference between the actual yaw rate $Y_r$ and the desired yaw rate $Y_d$ with a predetermined threshold yaw rate $Y_{th2}$ (step 28). If the difference therebetween is larger than the predetermined threshold yaw rate $Y_{th2}$, the ECU 15 executes the anti-yaw control continuously (step 26). On the other hand, if the difference therebetween is smaller than the predetermined threshold yaw rate $Y_{th2}$, the ECU 15 completes the anti-yaw control.

Meanwhile, in the step 24, if the difference between the actual yaw rate $Y_r$ and the desired yaw rate $Y_d$ is smaller than the predetermined threshold yaw rate $Y_{th1}$, the ECU 15 compares the roll rate $R_r$ with a predetermined threshold roll rate $R_{th2}$ (step 30).

If the roll rate $R_r$ is larger than the predetermined threshold roll rate $R_{th2}$, the ECU 15 executes the anti-roll control repeatedly (step 22).

Otherwise, if the roll rate $R_r$ is smaller than the predetermined threshold roll rate $R_{th2}$, the ECU 15 completes the anti-roll control (step 32). Next, the ECU 15 compares the difference between an actual yaw rate $Y_r$ and a desired yaw rate $Y_d$ with a predetermined threshold yaw rate $Y_{th3}$ (step 34). If the difference therebetween is larger than the predetermined threshold yaw rate $Y_{th3}$, the ECU 15 executes the anti-yaw control (step 26). On the other hand, if the difference therebetween is smaller than the predetermined threshold yaw rate $Y_{th3}$, the ECU 15 polls and compares the difference with the predetermined threshold yaw rate $Y_{th3}$ during a predetermined threshold time $T_{th}$. If the difference does not become larger than the predetermined threshold yaw rate $Y_{th3}$ during the predetermined threshold time $T_{th}$, the ECU 15 completes the control. The predetermined threshold time $T_{th}$ may be changed depending on the characteristics of the vehicle.

While the invention has been shown and described with respect to the preferred embodiments, it will be understood by those skilled in the art that various changes and modifications may be made without departing from the spirit and scope of the invention as defined in the following claims.

What is claimed is:

1. A method for providing anti-roll and an anti-yaw controls of a vehicle by controlling front and rear wheel dampers of the vehicle, said front and rear wheel dampers including left and right front wheel dampers, and left and right rear wheel dampers, and said method comprising the steps of:

deciding whether an anti-roll control is required by comparing a roll rate of the vehicle with a predetermined threshold roll rate;

executing the anti-roll control if the roll rate is larger than the predetermined threshold roll rate;

after deciding that an anti-roll control is required and executing the anti-roll control, deciding whether an anti-yaw control is required by comparing a difference between an actual yaw rate of the vehicle and a desired yaw rate with a predetermined threshold yaw rate; and executing the anti-yaw control if the difference between the actual yaw rate and the desired yaw rate is larger than the predetermined threshold yaw rate.

2. The method of claim 1, wherein the anti-roll control is performed by hard-controlling simultaneously both said right front wheel damper and said left front wheel damper and both said right rear wheel damper and said left rear wheel damper of the vehicle.

3. The method of claim 1, wherein the anti-roll control is performed by hard-controlling both said right front wheel damper and said left front wheel damper of the vehicle and by soft-controlling both said right rear wheel damper and said left rear wheel damper of the vehicle.

* * * * *